(12) United States Patent
Neisen

(10) Patent No.: US 6,508,681 B1
(45) Date of Patent: Jan. 21, 2003

(54) LOW FRICTION EXHAUST BELLOWS AND TECHNIQUES FOR CONSTRUCTING AND ASSEMBLING SUCH BELLOWS

(75) Inventor: Gerlad F. Neisen, Rockport, TX (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/588,519

(22) Filed: Jun. 5, 2000

(51) Int. Cl.[7] .................. B63H 21/32; F16L 21/00
(52) U.S. Cl. ........................... 440/89; 285/226
(58) Field of Search .................. 440/89; 285/226, 285/299, 300; 138/109, 173, 137; 92/34, 45, 46, 47

(56) References Cited

U.S. PATENT DOCUMENTS

| | | | | |
|---|---|---|---|---|
| 1,218,895 A | * | 3/1917 | Porter | 138/148 |
| 3,880,326 A | * | 4/1975 | Kennard et al. | 222/95 |
| 4,178,873 A | * | 12/1979 | Bankstahl | 440/89 |
| 4,582,092 A | * | 4/1986 | Nissen | 138/109 |
| 4,861,296 A | * | 8/1989 | Wlezien | 440/89 |
| 4,940,434 A | | 7/1990 | Kiesling | |
| 5,407,237 A | * | 4/1995 | Smolowitz | 285/31 |
| 5,408,827 A | | 4/1995 | Holtermann et al. | |
| 5,421,756 A | * | 6/1995 | Hayasaka | 440/89 |
| 5,560,396 A | * | 10/1996 | Kramer, Jr. | 138/109 |
| 5,653,478 A | * | 8/1997 | McGurk et al. | 285/227 |
| 5,749,609 A | * | 5/1998 | Steele | 285/226 |
| 5,829,483 A | * | 11/1998 | Tukahara et al. | 138/109 |

* cited by examiner

Primary Examiner—S. Joseph Morano
Assistant Examiner—Andy Wright
(74) Attorney, Agent, or Firm—Timothy J. Ziolkowski; J. Mark Wilkinson

(57) ABSTRACT

A propulsion system having a low-friction exhaust bellows relative to an engine located in the interior of a marine vessel is provided. The engine has an exhaust discharge member in communication with a propulsion unit, and an exhaust passage having an exterior coupling member flexibly connected to pass exhaust from the exhaust discharge member to the propulsion unit. The interior surface of the passage is configured to provide a relatively smooth surface to the exhaust passing therein.

31 Claims, 2 Drawing Sheets

LOW FRICTION EXHAUST BELLOWS AND TECHNIQUES FOR CONSTRUCTING AND ASSEMBLING SUCH BELLOWS

BACKGROUND OF THE INVENTION

The present invention is generally related to marine propulsion systems, and, more particularly, the present invention is related to exhaust bellows assemblies and techniques that may be used in a stern drive marine propulsion system.

FIG. 2 shows a cross-sectional view of a typical prior art exhaust system arrangement that uses a flexible bellows 50 for passing exhaust from an internal combustion engine to a passageway in a propulsion unit for discharge through the propeller. The exhaust may typically comprise exhaust gases and cooling water. As shown in FIG. 2, bellows 50 comprises a plurality of circumvolutions that allows bellows 50 to be flexibly extended for allowing respective pivotal motion of propulsion unit 14 about a generally vertical steering axis, and about a generally horizontal tilt/trim axis. As further shown in FIG. 2, a separate flexible bellows 52 encloses a universal joint 54 that allows for transmitting rotating power from the engine to the propulsion unit in fashion well-understood by those skilled in the art. It will be appreciated that the exhaust bellows arrangement should be reliable as such arrangement allows for containing the exhaust and noise during various trim and/or steering conditions. This prior art arrangement works generally satisfactory for most conditions. However, during periods of high volume of exhaust flow, such as during periods of high engine load, the circumvolutions in the interior of the bellows, as represented by the curls in the interior of bellows 50, may result in an undesirably high level of friction in the exhaust that flows in the bellows. The high friction in turn may cause a relatively high level of exhaust back pressure which results in reduced engine efficiency.

Manufacturers of marine propulsion systems have attempted to solve the foregoing issues but some of these attempts may have their own side effects. For example, the following two prior art arrangements may have somewhat helped to reduce back pressure but each is believed to suffer from increased exhaust noise or exhaust leakage, or both. One of such exhaust arrangements allows for providing transom exhaust relief holes for discharging exhaust ahead of the bellows. The other prior art exhaust arrangement, once used but abandoned because of its side effects, substituted two straight slip-together rubber tubes, in lieu of a flexible bellows, to carry the exhaust. Unfortunately, such arrangement, like the one with exhaust relief holes, resulted in leaking exhaust and noise during various trim and steering conditions.

In view of the foregoing discussion, it is desirable to provide a bellows assembly that can be produced and maintained at a low cost and that avoids such side effects while reducing exhaust flow friction so as to reduce exhaust back pressure and achieve high engine efficiency without creating annoying exhaust noises during high engine load. It is further desirable to provide a kit exhaust assembly that may be inexpensively and quickly retrofitted in a deployed fleet of boats.

SUMMARY OF THE INVENTION

Generally speaking, the foregoing needs are fulfilled in one exemplary embodiment by providing a propulsion system made up of an engine located in the interior of a marine vessel. The engine has an exhaust discharge member in communication with a propulsion unit, and an exhaust passage having an exterior coupling member flexibly connected to pass exhaust from the exhaust discharge member to the propulsion unit. The interior surface of the passage is configured to provide a relatively smooth surface to the exhaust passing therein.

The present invention further fulfills the foregoing needs by providing in another exemplary embodiment an assembly for connecting the rotary output of an inboard engine to a propulsion unit. The engine has an exhaust discharge member in communication with the propulsion unit. The assembly is made up of a universal joint interconnected between the engine and the propulsion unit, and an exhaust passage that surrounds the universal joint and comprises a pair of coupling members flexibly connected to pass between one another exhaust from the exhaust discharge member to the propulsion unit. Each coupling member is configured to provide a respective smooth surface to the exhaust passing therein.

Figure 1:
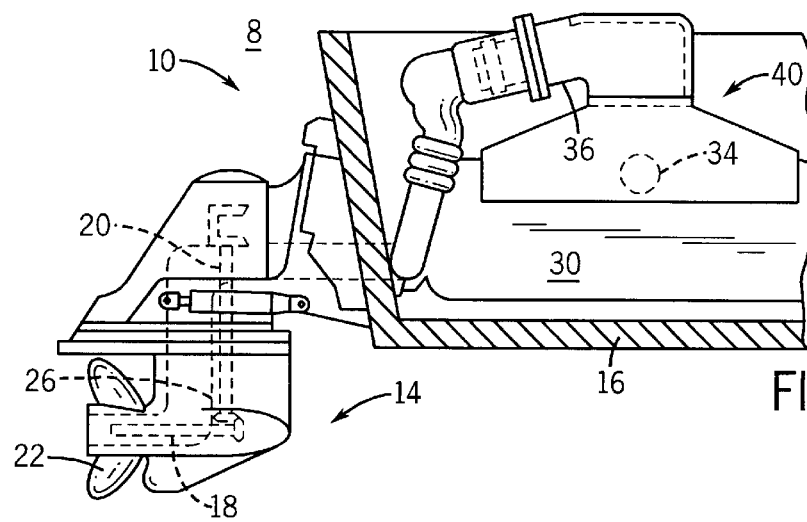
FIG. 1 is a partial side elevational view, partially broken away, of a marine propulsion system embodying the present invention.
Figure 2:
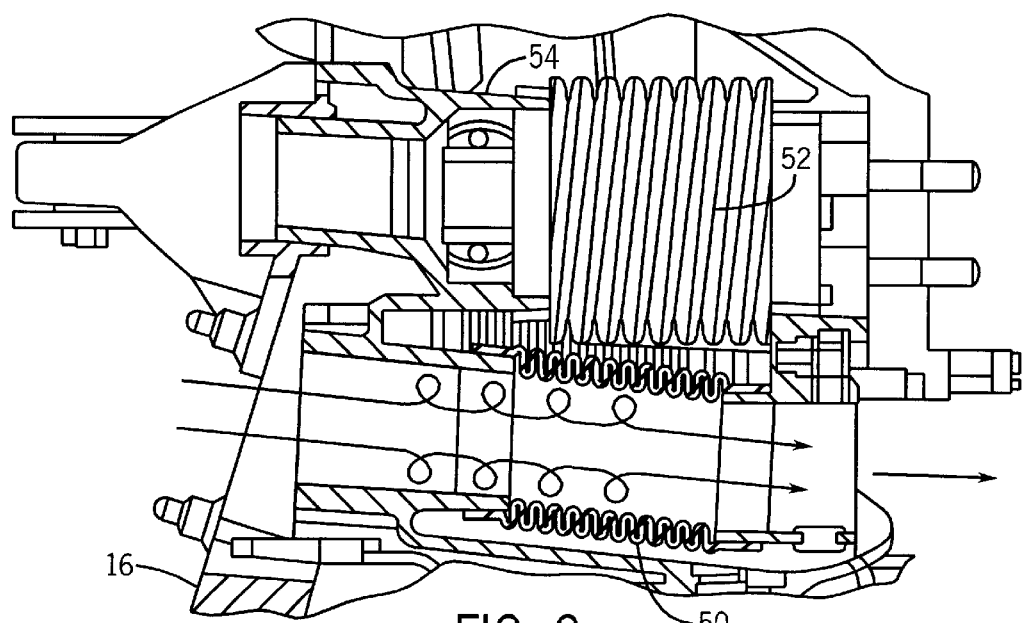
FIG. 2 is a cross-sectional view of one common prior art bellows arrangement.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 illustrates a marine propulsion system 8 embodying the present invention. While the invention is described in the context of a stern drive unit 10, it should be understood that the invention is applicable to other types of marine propulsion systems, and to other devices including internal combustion engines.

The stem drive unit 10 includes a propulsion unit 14 mounted on a boat 16 for pivotal movement relative thereto about a generally vertical steering axis and about a generally horizontal tilt axis. The propulsion unit 14 includes a main drive shat 20 coupled through suitable gears to a propeller shaft 18 having thereon a propeller 22. The propulsion unit 14 also includes an exhaust passageway 26 which, as is known in the art, passes through the hub of the propeller 22.

The stem drive unit 10 also comprises an internal combustion engine 30 mounted within the boat 16 and drivingly connected to the propeller shaft 18 in a known manner. The internal combustion engine 30 includes a plurality of exhaust ports 34 (one is shown in FIG. 1). The stem drive unit 10 also comprises an exhaust discharge member 40 communicating between the engine exhaust ports 34 and the propulsion unit exhaust passageway 26 by way of a flexible exhaust passage 100, (FIGS. 3 and 5), as described below.

Figure 3:
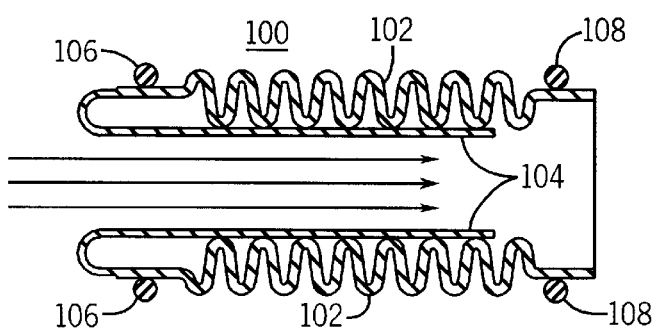
FIG. 3 is a cross sectional view of one exemplary installed exhaust passage embodying the present invention and illustrating a bellows section and a smooth section that provides an interior smooth surface to exhaust passing therein.
Figure 5:
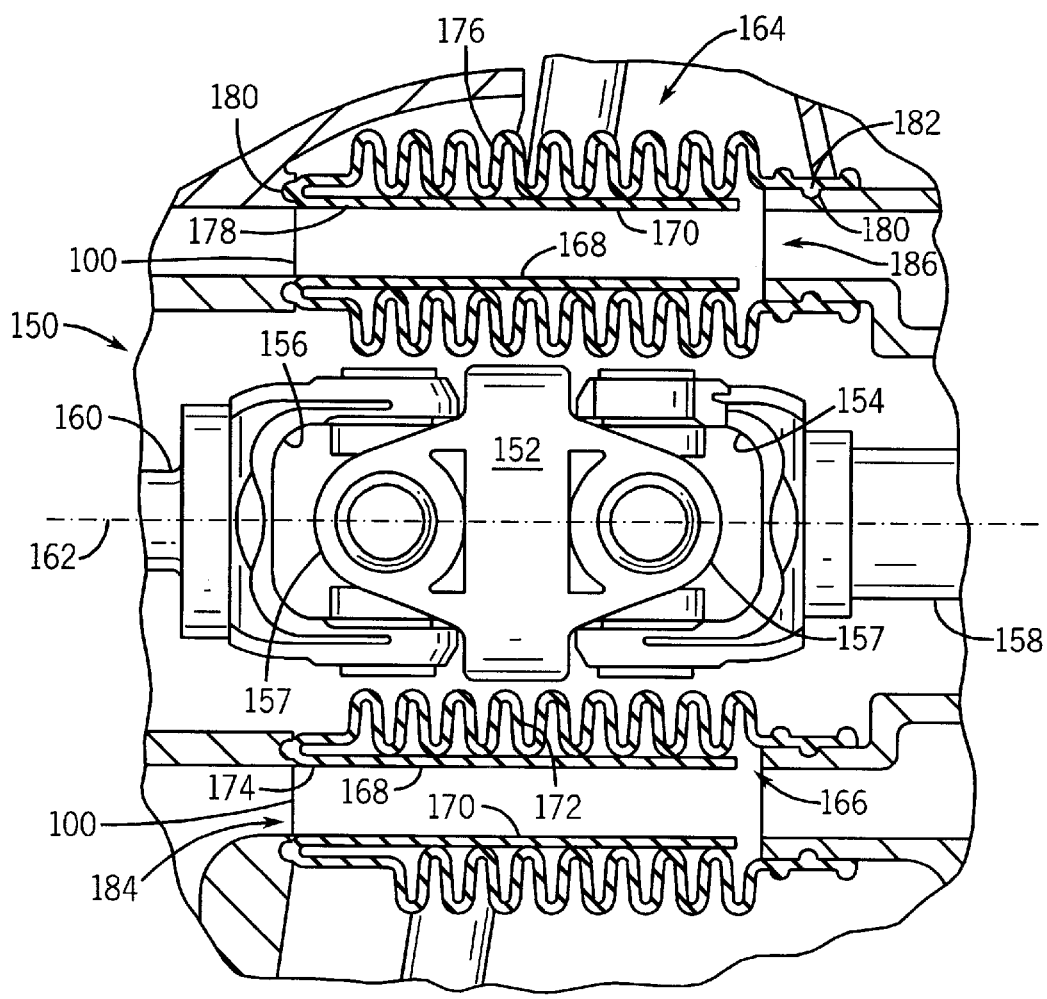
FIG. 5 is a partial side elevational view, partially broken away, of another exemplary exhaust passage embodying the present invention and annularly enclosing a universal joint assembly, and wherein respective inner and outer bellows sections with respective foldable smooth sections provide respective smooth surfaces to exhaust passing therethrough.

FIG. 3 shows one assembled exemplary exhaust passage 100 embodying the present invention. As shown in FIG. 3, exhaust passage 100 may be made up of an external coupling member, such as a flexible bellows 102, that maybe flexibly connected to pass exhaust from the exhaust discharge member 40 (FIG. 1) of the engine to exhaust passageway 26 (FIG. 1) of the propulsion unit As further shown in FIG. 3, exhaust passage 100 comprises an interior surface configured to provide a relatively smooth surface 104 to the exhaust passing in exhaust passage 100. As used herein, a relatively smooth surface refers to a surface substantially free of the circumvolutions generally encountered in a flexible bellows. Fastening means, such as respective clamps 106 and 108, allow for fastening the exhaust passage to the engine discharge member and to the propulsion unit at the exhaust intake end 184 and the exhaust discharge end 186, respectively, as shown in FIG. 5. It will be appreciated that the fastening means need not be limited to clamps, since other types of fastening means may be equally acceptable. For example, as shown in FIG. 5, the fastening could comprise a groove 180 configured to receive a corresponding latching protrusion 182.

Figure 4:
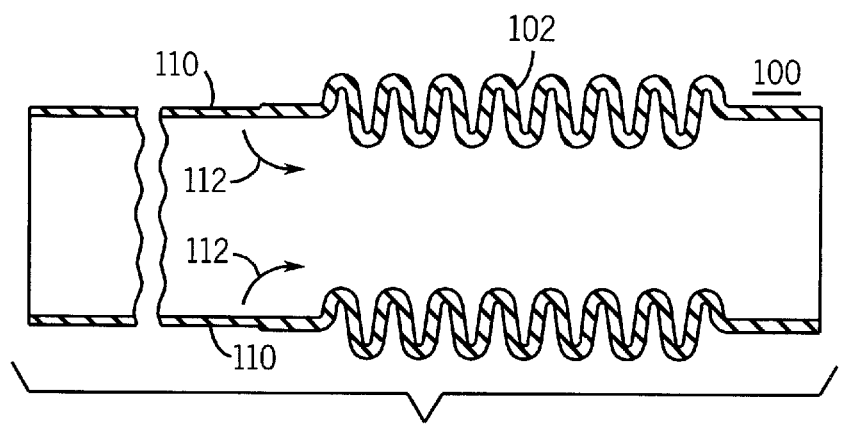
FIG. 4 is a cross-sectional view of the exemplary embodiment of FIG. 3, prior to installation and subsequent to the exhaust passage being constructed, e.g., by molding, as a single-piece assembly.

FIG. 4 shows one exemplary embodiment subsequent to being constructed, e.g., by molding, and prior to assembly. As shown in FIG. 4, exhaust passage 100 may be constructed as an integral-piece, e.g., a single piece of molded rubber material, comprising bellows section 102 and a foldable smooth section 110 extending from one end of the bellows section. During assembly operations, smooth section 110 is folded into the interior of the bellows section to define the interior smooth surface of the bellows passage. It will be appreciated that the present invention need not be limited to a single-piece molding construction being that the interior surface of the exhaust passage could be made as a separate piece from the bellows section, such as a smooth sheath of rubber or latex material affixed to one end of the bellows. In either construction, it will be appreciated that the bellows and smooth sections may comprise generally cylindrical walls having a respective thickness and wherein the thickness of the smooth section is made relatively thinner relative to the thickness of the bellows section. By way of example and not of limitation, the walls of an exemplary foldable section made of rubber could have a thickness of about 15 to 20 hundredths of an inch while the bellows section could have a thickness of about 75 to 80 hundredths of an inch. It will be appreciated that other thickness dimensions may be employed depending on the specific type of material used, such as rubber reinforced with fibers and other synthetic rubber-like materials, and further depending on the expected level of exhaust pressure that may develop a given engine application. For example, higher exhaust pressures may require higher wall thickness. It will be further appreciated that the respective end from which the smooth section extends or the separate sheath extends should be positioned at the entrance of the exhaust passing through exhaust passage 100 since the exhaust flow would help to maintain the inside shape of the smooth surface. The above consideration follows since the exhaust generally flows in one direction, i.e., from the engine discharge port to the discharge port in the hub of the propeller.

It will be understood that the embodiment discussed in FIGS. 3 and 4 presume that the engine exhaust is conducted through a separate conduit relative to a universal joint assembly 150 (FIG. 5) that allows for passing rotating power from the engine to the drive unit. However, it will be appreciated that the present invention can be readily employed in bellows arrangements wherein the universal joint assembly is annularly enclosed by an exhaust passage.

As shown in FIG. 5, universal joint assembly 150 includes a universal joint 152 of usual construction which may be made up of a forward yoke 154 and a rearward yoke 156 which are joined to a rotatable intermediate member, commonly 10 referred to as a cross 157. Forward yoke 154 includes a yoke shaft 158 which is connected to the engine output shaft (not shown). Similarly, rearward yoke 156 includes a yoke shaft 160 which is generally coaxial with yoke shaft 158, on a common drive axis 162. Shaft 160 extends rearwardly and is provided at its rearmost end with a suitable gear that meshes with a pinion disposed on main drive shaft 20 (FIG. 1) in propulsion unit 14. Rotation of forward yoke shaft 158 causes rotation of universal joint 152, and rotation of rearward yoke shaft 156 to drive the main drive shaft and ultimately the propeller.

As further shown in FIG. 5, exhaust passage 100 annularly surrounds the universal joint and may be made up of a pair of coupling members 164 and 166 flexibly connected to pass between one another exhaust from the engine discharge member to the propulsion unit. Each coupling member is configured to provide a respective smooth surface 168 and 170 to the exhaust passing in the annular passageway defined between the pair of coupling members 164 and 166. More particularly, one of the coupling members, e.g., coupling member 166, comprises an inner bellows section 172 and a foldable smooth section 174 that extends from one end of inner bellows section 172 and that may be folded to the exterior of the inner bellows to define the respective smooth surface 168 of the exhaust passage provided by inner coupling member 166. Similarly, the other coupling member, e.g., coupling member 166, comprises an outer bellows section 176 having a foldable smooth section 178 that extends from one end of outer bellows 176 and that may be folded into the interior of the outer bellows section to define the respective smooth surface 170 of the exhaust passage provided by that outer coupling member.

It will be appreciated that by constructing respective smooth extensions molded off from a respective end of the bellows and then folding such smooth extensions, either in the embodiment that provides an exhaust passageway separate from the universal joint assembly, or in the embodiment that provides an exhaust passageway that annularly encloses the universal joint assembly, in operation the present invention allows for avoiding or greatly reducing exhaust or acoustical leakage, or both, while permitting fall gimbaling motion to the propulsion unit, e.g., tilt/trim and steering motion. Once again, the smooth sections that avoid the relatively high fluid friction drag that otherwise would be created by a bellows interior with multiple circumvolutions could be constructed as separate pieces. It will be appreciated, however, that the molding construction of the smooth or straight section at the end of the bellows section and then folding such section to provide smooth surfaces to the exhaust would add very little cost to manufacturing costs while it would allow for reducing back pressure by up to at least one to two pounds per square inch (psi) in one exemplary stem drive implementation. By way of example, a back pressure of 1.5 psi may be shown to be equivalent to approximately 10 Hp, which on a large marine engine would correspond to a 20% reduction in back pressure. With stem drives growing in power, such as may be enabled with larger internal combustion engines, the present invention allows for avoiding increased noise and efficiency loss that would otherwise occur were it not for the present invention.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A propulsion system comprising:
    an engine located in the interior of a marine vessel, the engine having an exhaust discharge member in communication with a propulsion unit; and an exhaust passage having:
        a flexible outer surface coupled to the exhaust discharge member and comprising a bellows section having a plurality of bellows;
        a relatively smooth interior surface seamlessly connected to the flexible outer surface;
        an integral and a foldable smooth section extending from one end of the bellows section inward to form the relatively smooth interior surface inside the exhaust passage; and
        wherein the foldable smooth section is folded into the interior of the bellows section to define said relatively smooth interior surface of the exhaust passage such that the foldable smooth section extends within the exhaust passage past a majority of the bellows of the bellows section.

2. The propulsion system of claim 1 wherein the bellows and smooth sections respectively comprise generally cylindrical walls having a respective thickness and wherein the thickness of the smooth section is thinner relative to the thickness of the bellows section.

3. The propulsion system of claim 2 wherein the bellows and smooth sections comprise an integrally-molded piece.

4. The propulsion system of claim 2 wherein the respective end from which the smooth section extends is positioned at the entrance of the exhaust passing therethrough.

5. The propulsion system of claim 1 wherein the exhaust passage includes a respective fastener configured to fasten the exhaust passage to the exhaust discharge member and the propulsion unit.

6. The propulsion system of claim 5 wherein the fastener comprises a clamp.

7. The propulsion system of claim 5 wherein the fastener comprises a groove configured to receive a corresponding latching protrusion.

8. The propulsion system of claim 1 wherein the interior surface of the exhaust passage comprises a smooth sheath affixed to one end of the bellows.

9. The propulsion system of claim 8 wherein the respective end from which the smooth sheath extends is positioned at the entrance of the exhaust passing therethrough.

10. An assembly for connecting the rotary output of an inboard engine to a propulsion unit, the engine having an exhaust discharge member in communication with the propulsion unit, the assembly comprising:
    a universal joint interconnected between the engine and the propulsion unit;
    an exhaust passage having a first bellows section and a second bellows section, the exhaust passage surrounding the universal joint and connected to pass exhaust between the first bellows section and the second bellows section from the exhaust discharge member to the propulsion unit, each bellows section having:
        a sinuous outer section having a plurality of circumvolutions, each circumvolution having a pair of sidewalls;
        a circumvolutionless inner section extending from an exhaust intake end to an exhaust output end and seamlessly formed to the sinuous outer section at the exhaust intake end; and
        wherein the circumvolutionless inner section extends adjacently along an interior edge of each circumvolution such that a null space is formed between the pair of sidewalls.

11. The assembly of claim 10 wherein the circumvolutionless inner section communicates and extends from an end of the flexible tube.

12. The assembly of claim 10 wherein tie circumvolutionless inner section defines a smooth surface for exhaust passage.

13. An exhaust tube assembly comprising:
    a first and second ends defining an exhaust passage therebetween, wherein the first end is capable of receiving exhaust therein and the second end is capable of discharging exhaust therefrom;
    an outer section formed of a flexible bellows;
    an inner section configured to pass exhaust from the first end to the second end and is relatively frictionless and is curvilinearly formed to the first end of the outer section in an integral one-piece assembly; and wherein the inner section extends inwardly past a majority of the flexible bellows.

14. The exhaust tube assembly of claim 13 wherein the outer section includes a plurality of circumvolutions to provide flexibility and extendibility to the exhaust tube assembly.

15. The exhaust tube assembly of claim 14 wherein the first end defines a U-shaped sealing end and the second end fits over a rigid exhaust member and is retained thereto with a surface clamp.

16. The exhaust tube assembly of claim 13 wherein the outer section and the inner section are seamlessly connected to one another and at least a portion is made of pliable material to allow the inner section to be folded within the outer section.

17. The exhaust assembly tube of claim 13 sized to seal an annular exhaust passage that surrounds a U-joint in an outboard marine engine.

18. The exhaust tube assembly of claim 13 wherein the inner section is substantially planar and the outer section is substantially sinusoidal-shaped, and the inner section is folded over within the outer section to form a U-shape in the first end.

19. A motor having a back pressure limiter comprising:
    an internal combustion engine;
    an exhaust discharge port; and
    a one-piece exhaust discharge hose coupled to the engine at one end and the exhaust discharge port at another end and configured to provide an exhaust passageway to discharge exhaust generated by the engine, the one-piece exhaust discharge hose having:
- a flexible section extending from an exhaust intake end to an exhaust discharge end;
- a planar section configured concentric to the flexible section and extending from the exhaust intake end substantially to the exhaust discharge end; and
- a curvilinear joint connecting the flexible section and the planar section at the exhaust intake end.

20. The motor of claim 19 wherein the flexible section is sinuously configured.

21. The motor of claim 19 wherein the planar section is configured adjacent to a portion of the flexible section and is constructed of a pliable material.

22. The motor of claim 19 wherein the curvilinear joint provides a seamless connection between the flexible section and the planar section.

23. The motor of claim 19 wherein the planar section includes a substantially frictionless surface as compared to that of the flexible section.

24. A method of providing a back pressure limiter for an internal combustion engine, the method comprising the steps of:
- providing a contiguous tube having a first section and a second section;
- configuring bellows in the first section;
- configuring the second section with planar surfaces;
- creating a curvilinear section at one end of the contiguous tube by folding the second section inside the first section such that the planar surfaces extend interiorly within the contiguous tube past a majority of the bellows; and
- connecting the curvilinear section to an exhaust intake port and connecting another end of the contiguous tube to an exhaust discharge port.

25. The method of claim 24 further comprising the step of providing a pressure discharge passageway defined by a relatively smooth surface in the second section.

26. The method of claim 25 wherein the relatively smooth surface is frictionless as compared to the first section.

27. The method of claim 24 wherein the curvilinear section is U-shaped

28. The method of claim 24 further comprising the step of positioning the first section and the second section parallel to one another.

29. A kit for providing a low friction passageway from an exhaust discharge member of an inboard engine to a propulsion unit rearwardly located relative to a transom of a boat, the kit comprising;
- an exhaust discharge coupler couplable at one end to an exhaust discharge port;
- a hose couplable at one end to an exhaust intake port and couplable at another end to the exhaust discharge coupler, the hose having:
  - a flexible outer section forming a bellows configuration having a plurality of bellows allowing flexation therein; and
  - a relatively frictionless inner section contiguously and integrally connected to the flexible outer section at one end of the flexible outer section to form a U-shaped end of the hose and extending interiorly within the hose past a majority of the plurality of bellows of the flexible outer section.

30. The kit of claim 29 wherein the flexible outer section includes a sinuous region.

31. The kit of claim 29 wherein the integral connection of the flexible outer section and the relatively frictionless inner section is seamless and forms a curvilinear connection.

* * * * *

UNITED STATES PATENT AND TRADEMARK OFFICE
CERTIFICATE OF CORRECTION

PATENT NO.   : 6,508,681 B1
DATED        : January 21, 2003
INVENTOR(S)  : Neisen, Gerald F.

It is certified that error appears in the above-identified patent and that said Letters Patent is hereby corrected as shown below:

<u>Column 4,</u>
Line 58, delete "fall" and substitute therefor -- full --;

<u>Column 5,</u>
Lines 3 and 6, delete "stem" and substitute therefor -- stern --.

Signed and Sealed this

Seventeenth Day of June, 2003

JAMES E. ROGAN
*Director of the United States Patent and Trademark Office*